Aug. 4, 1936. J. E. BOURQUE 2,050,081
DIRECTION INDICATOR FOR MOTOR VEHICLES
Filed Aug. 23, 1934 2 Sheets-Sheet 1
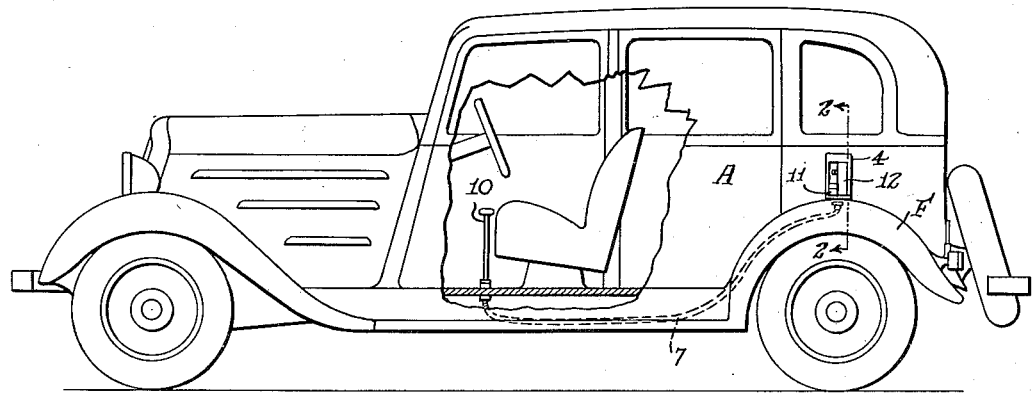
Inventor
J. Emile Bourque
by Ellis Spear Jr.
Attorney Aug. 4, 1936.  J. E. BOURQUE  2,050,081
DIRECTION INDICATOR FOR MOTOR VEHICLES
Filed Aug. 23, 1934   2 Sheets-Sheet 2
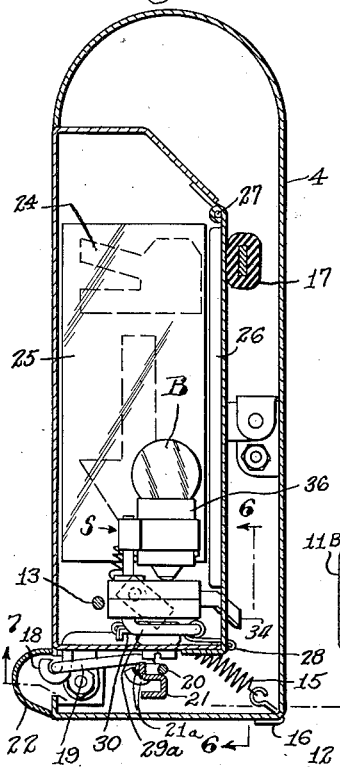
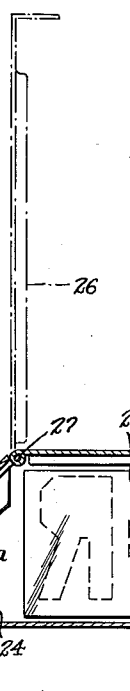
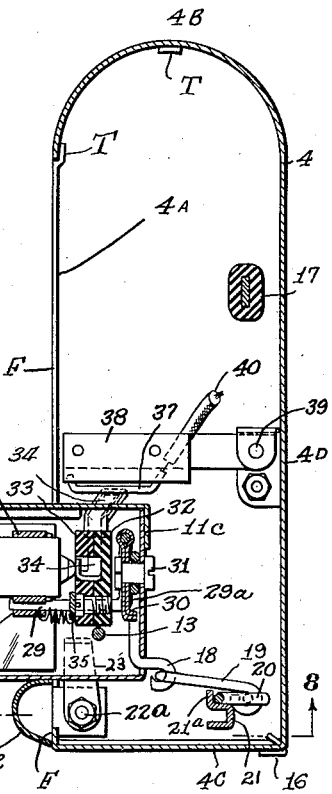
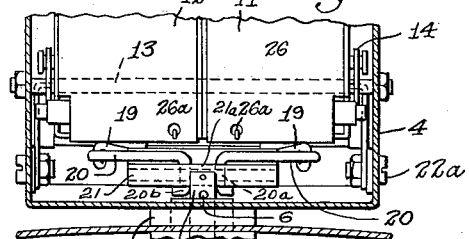
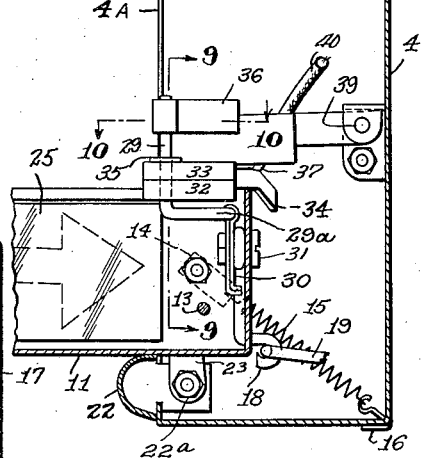
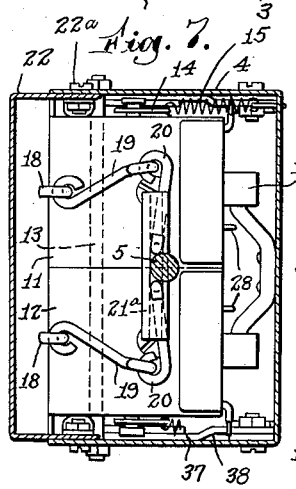
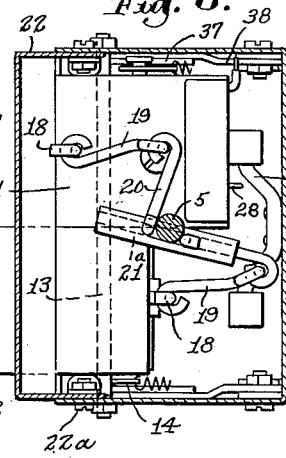
Inventor
J. Emile Bourque
by Ellis Spackh.
Attorney Patented Aug. 4, 1936

2,050,081

UNITED STATES PATENT OFFICE 2,050,081

DIRECTION INDICATOR FOR MOTOR VEHICLES

Joseph Emile Bourque, Hartford, Conn.

Application August 23, 1934, Serial No. 741,109

3 Claims. (Cl. 116—53)

This invention relates to improvements in direction indicators particularly adapted for use with motor vehicles.

The need for such a device has long been recognized and many attempts have been made to provide a direction indicator of low cost that would fulfill the requirements. While some of these have operated successfully under certain circumstances their limited acceptance indicates that prior devices have not been of real utility and, indeed, even with these attempts the marked improvement in highways and the improved performance of all vehicles, whether pleasure or commercial, has made the need more urgent.

The need for such a device is not merely due to the failure of many motorists to give some manual indication of direction changes, for the human factor cannot be eliminated. The necessity of uniform signals is one factor, but the real requirement is that such signals shall be clearly visible by night as well as by day, impossible with hand signals at night and even in the daytime with many commercial vehicles. Weather conditions with closed windows render hand signals difficult, if indeed, under those circumstances, they are not entirely neglected.

To meet these difficulties, I provide an inexpensive device that is operated by the driver in advance of the change in direction of the vehicle providing for all the usual traffic requirements.

My device includes a pair of arms with arrows and signs indicating opposite directions. These, when released by the operator, are illuminated.

The device itself is extremely simple and durable and may be manufactured as the signal arms and the arrows may be stamped out of sheet metal. It may be repaired with ease as all the parts are accessible and may be readily removed and replaced.

In the drawings and specification I have shown and described a simple embodiment of my invention.

In the drawings:

Fig. 1 is a view showing a standard installation of my device and an indicated control therefor.

Fig. 2 is a sectional view along the line 2—2 of Fig. 1.

Fig. 3 is a sectional view showing the interior of one of the indicating signs.

Fig. 4 is a view similar to Fig. 3 with the signal in operative position and showing the details of constructon of the bulb socket and circuits thereto.

Fig. 5 is a view similar to Fig. 4 structurally showing the spring in control of the sign and the socket swung out for removal.

Fig. 6 is a view along the line 6—6 of Fig. 3.

Fig. 7 is a view of the sign shown in Fig. 6 viewed along the line 7—7 of Fig. 3.

Fig. 8 is similar to Fig. 7 showing the actuating means in position after one of said signal arms has been released.

Fig. 9 is an illustration of the bulb socket and hinge therefor viewed along the line 9—9 of Fig. 5, and Fig. 10 is a cross sectioned view of the bulb receiving clamp along the line 10—10 of Fig. 5.

In the form shown I preferably mount my device on the left rear fender F of an automobile A according to generally accepted practice. A hollow bolt 1 externally threaded above a flange 1a extends through the fender F and receives the threaded member 3 secured to the metal housing 4. A shaft 5 is fitted within the bolt 1 and held in position by the pin 6. The flexible cable 7 is secured to the bolt 1 which is rotatable in relation thereto. The flexible shaft 8 is protected by the cable 7 and is formed to interengage the shaft 5 as indicated at 9 and is connected with means indicated at 10 suitably positioned near the operator for rotating the shaft 8 when it is desired to signal a subsequent change in direction.

Referring to the signal device as shown the casing 4 is formed to provide an open front 4A which normally is substantially filled or blocked with the two hollow signal arms 11 and 12 which are pivotally mounted in the casing 4 as on a bolt 13 extending through the casing and mounted on the walls thereof, said bolt passing through the signal arms near the lower outer corners thereof so that when in said casing they normally lean inwardly against the rest 17. Each of the signal arms 11 and 12 carries a pivoted plate 14 which is held by a spring 15 anchored as at 16 to the casing 4 to return the signal arms 11 and 12 to their normal position after use upright in the casing 4 against the rubber cushioned bumper 17. The signals 11 and 12 are carried downwardly against the action of this spring 15 at the will of the operator as I shall now describe.

The signal arms 11 and 12 are each provided with a hook 18 to which is secured a link 19 secured to an arm 20 which has a downturned portion 20a extending through and pivotally locked to the stop 21 by the inturned portion 20b. As shown in Figs. 3 and 4, the bar 21 fast on the shaft 5 has a stop 21a adapted to engage either of the arms 20 and carry the same with the bar 21 as it rotates with the shaft 5. Rotation of the shaft 5 with the bar 21, for example, to the right or counter clockwise, will carry that arm 20 contacted by the stop 21ᵃ rearwardly from the position of Fig. 7 to that of Fig. 8. This results in the link 19 connected to that arm 20 pulling the signal arm 12 to which it is connected at its lower outer end (see Fig. 3) inwardly and downwardly against the action of the spring 15 and over its own center of balance until it lies in the horizontal position in which the signal 12 is shown in Figs. 2 and 4.

During this movement of the signal 12 the signal 11 is unaffected as the stop 21ᵃ is swung away from its arm 20 which freely pivots on the bar 21. As shown, these pivot points 20ᵃ are so closely adjacent the shaft 5 that movement of the bar 21 as it rotates with the shaft does not affect the signal not in use as would be the case if the pivot were more remote from the shaft.

As the shaft 5 returns to neutral position the spring 15 carries the arm 12 back into the housing 4 against the buffer 17, the members 19, 20 and 21 resuming the neutral position of Figs. 6 and 7.

If rotated in the opposite direction or clockwise, the stop 21ᵃ engages the arm 20 controlling the signal 11 and that signal is moved to signalling position in the manner just described relative to the signal 12.

I have indicated in Fig. 4 certain details of construction of the housing 4 and the members 11 and 12 which will suggest the shape of blanks stamped out of sheet metal from which they may be most efficiently made. Such a sheet includes side walls 4ᴬ and 11ᵃ stamped out as shown in the drawings and a central piece forming the backs 4ᴰ and 11ᴰ of the members 4 and 11 respectively. The central piece includes sufficient stock to form, when shaped to conform to the contours of the side walls 4ᴬ and 11ᵃ, the tops 4ᴮ and 11ᴮ and the bottoms 4ᶜ and 11ᶜ of the housing 4 and the member 11 respectively. Such a blank is also formed with tabs indicated as at T to permit the sides and tops to be secured together in any desired way. The side walls 4ᴬ may be formed with excess stock adapted to be formed into a flange F so that with the members 11 and 12 the open front of the casing 4 may be filled. To conceal the mechanism to actuate the members 11 and 12, I provide a cover 22 which is secured to the side walls 4ᴬ by bolts 22ᵃ which also secure the guides 23 which space the members 11 and 12 from the flanges F on the side walls 4ᵃ.

Each of the signal arms 11 and 12 is adapted to be viewed from the front and rear and each of them is provided with apertures 24 covered with a transparent cover 25. For the simplest and most effective direction indicia, I provide one signal arm 11 with a letter "R" and an arrow pointed towards the right and the other signal arm or member 12 with an indicated left turn or "L" and an arrow pointed towards the left. Each of the signal arms 11 and 12 formed as described is hollow and is provided with a cover member 26 hinged as at 27 and held shut by a spring lock 28.

Within each of the signal arms or members 11 and 12 is a bulb B which may be of different colors as also may be the transparent covering 25 for the apertures 24, but no attempt is made to illustrate this variant.

The bulb B is mounted in a socket generally designated at S (Fig. 3). My socket is extremely simple, and while very strong, it may be easily taken apart to be serviced. For it I provide a U-shaped member 29 bent at a right angle to form the base 29ᵃ of my socket S (see Figs. 4, 9, and 10). The base 29ᵃ is secured to a hinge 30, which hinge is secured to the signal arms 11 and 12 as indicated at 31. The spring lock 28 extends from the hinge 30.

In the form shown, two pieces of insulating material 32 and 33 are apertured to pass over the upright portion of the U-shaped member 29 to hold the conducting strip 34 between them. A lock plate 35 is also apertured and cleared to pass over the member 29 and spaced so as to compress the U-shaped member 29, and lock the insulating pieces 32 and 33 thereon. The plate 35 is apertured to permit the bulb B to bear against the conductor 34.

Above this I place my integrally formed socket clamp 36 to receive the bulb as a bayonet joint. Such a joint I provide for on a simple basis by making the clamp 36 from a strip formed with reverse bends, one of which is flattened to compressibly fit on to the U-member 29 and the other formed near its end to bear against the base of the bulb B leaving two places 36ᵃ and 36ᵇ for the studs Bᵃ on the bulb base and a simple and most effective bayonet joint is effected.

On each side 4ᵃ of the casing 4 and concealed when my device is inoperative by the flange F are insulator strips 38 mounted on the side walls 4ᵃ as indicated at 39. A wire 40 from a battery (not shown) leads to each strip 38 where it terminates in a contact 37 carried by the strips 38. These contacts 37 are positioned to be contacted by the conductors 34 when the arms 11 and 12 are moved downwardly into operating position.

The bulb B as may be seen in Fig. 3 is mounted rearwardly of the pivot 13 which pivot is forwardly of the center of gravity of the member 11 when in upright position. As the members 11 and 12 are made of light weight stock, the weight of the bulb B and its socket cooperate in returning the members 11 and 12 to their inoperative position even as it retards their initial movement into view.

My device, so constructed, is inexpensive to manufacture as many of its parts as above indicated may be stamped out. It is lightweight and positive in its operation so that it is well adapted to fulfill the practical requirements for all uses to which such a direction indicator might be put.

What I therefore claim and desire to secure by Letters Patent is:

1. In a direction indicator, a housing, a pair of signalling members commonly pivotally mounted in said housing, means adapted to carry said members singly as desired to signalling position, said means including a rotatable shaft, a bar fixed on said shaft, arms pivoted on said bar on opposite sides of said shaft, connections from each of said arms to one of said signals, means included in said bar adapted to operatively engage one of said arms as said shaft is rotated in desired direction, whereby said arm is swung to position to actuate said connections to pivot the desired signal arm to signalling position, the other arm pivoted to the said bar on the opposite side of said shaft remaining stationary as its end of said bar rotates thereabout as said bar is carried with said shaft in its rotation, and means returning said signal members to said housing as said shaft returns to neutral position.

2. In a direction indicator, a housing, a pair of signalling members commonly pivotally mounted in said housing, means adapted to carry said members singly as desired to signalling position, said means including a rotatable shaft, a bar fixed on said shaft, arms pivoted on said bar on opposite sides of said shaft, connections from each of said arms to one of said signalling members, a longitudinal upwardly extending flange on said bar adapted to operatively engage one of said arms as said shaft is rotated in one direction, and to engage the other arm as said shaft is rotated in the opposite direction, whereby said arms are swung to position to actuate said connections to pivot the desired signal arm to signalling position, and means whereby the inoperative signal is retained in inoperative position during operation of the operating signal, and means returning said operating signal to said housing as said shaft returns to neutral position.

3. In a direction indicator, a support, a pair of signalling members commonly pivotally mounted in said support, means adapted to carry said members singly as desired to signaling position, said means including a rotatable shaft, a bar fixed on said shaft, arms pivoted on said bar on opposite sides of said shaft, connections from each of said arms to one of said signals, means included in said bar to operatively engage one of said arms as said shaft is rotated in desired direction, whereby said arms is swung to position to actuate said connections to shift the desired signal member to signalling position, the other arm pivoted to said bar on the opposite side of said shaft remaining stationary as its end of said bar rotates thereabout as said bar is carried with said shaft in its rotation, and means returning said signal members to non-signalling position as said shaft returns to neutral position.

J. EMILE BOURQUE.